United States Patent
Fish et al.

(10) Patent No.: US 11,433,304 B2
(45) Date of Patent: Sep. 6, 2022

(54) METHODS OF APPLYING VIRTUAL WORLD ELEMENTS INTO AUGMENTED REALITY

(71) Applicant: Wormhole Labs, Huntington Beach, CA (US)

(72) Inventors: Robert D. Fish, Irvine, CA (US); Curtis Hutten, Laguna Beach, CA (US)

(73) Assignee: Wormhole Labs, Inc., Sherman Oaks, CA (US)

( * ) Notice: Subject to any disclaimer, the term of this patent is extended or adjusted under 35 U.S.C. 154(b) by 0 days.

(21) Appl. No.: 17/223,934

(22) Filed: Apr. 6, 2021

(65) Prior Publication Data

US 2021/0220737 A1 Jul. 22, 2021

Related U.S. Application Data

(63) Continuation of application No. 16/361,150, filed on Mar. 21, 2019, now Pat. No. 10,994,201.

(51) Int. Cl.
*A63F 13/52* (2014.01)
*G06T 19/00* (2011.01)
(Continued)

(52) U.S. Cl.
CPC .............. *A63F 13/52* (2014.09); *A63F 13/32* (2014.09); *A63F 13/332* (2014.09);
(Continued)

(58) Field of Classification Search
None
See application file for complete search history.

(56) References Cited

U.S. PATENT DOCUMENTS

| 5,912,720 A | 6/1999 | Berger et al. |
| 7,796,155 B1 | 9/2010 | Neely, III et al. |

(Continued)

FOREIGN PATENT DOCUMENTS

| WO | 2013052855 A2 | 4/2013 |
| WO | 2018047064 | 3/2018 |

OTHER PUBLICATIONS

International Search Report and Written Opinion for International Application No. PCT/US2020/023971, dated Jul. 9, 2020, 11 pages.

*Primary Examiner* — James S. McClellan
*Assistant Examiner* — Peter J Iannuzzi
(74) *Attorney, Agent, or Firm* — Fish IP Law, LLP (57) ABSTRACT

In a method for providing an augmented reality interface for use by a first real-world human user and a second real-world human user, an augmented reality and virtual reality engine (AR-VR engine) retrieves a first set of user data associated with the first user, wherein the first set of user data is associated with a third-party virtual environment. The AR-VR engine renders a first visual transformation of the first user and an electronic interface through which the second user can interact with at least one of the first visual transformation of the first user and the transformed visual environment. The AR-VR engine detects a change in a virtual object associated with the first user and the third-party virtual environment and identifies a real-world object corresponding to the virtual object using a sensor. The AR-VR engine links the real-world object and the virtual object and renders the change associated with the virtual object onto the real-world object.

10 Claims, 6 Drawing Sheets

(51) Int. Cl.
*A63F 13/335* (2014.01)
*G06T 19/20* (2011.01)
*A63F 13/32* (2014.01)
*A63F 13/332* (2014.01)

(52) U.S. Cl.
CPC .......... *A63F 13/335* (2014.09); *G06T 19/003* (2013.01); *G06T 19/006* (2013.01); *G06T 19/20* (2013.01); *G06T 2200/24* (2013.01)

(56) References Cited

U.S. PATENT DOCUMENTS

| | | |
|---|---|---|
| 8,068,983 B2 | 11/2011 | Vian et al. |
| 8,516,381 B2 | 8/2013 | Bromenshenkel et al. |
| 8,814,691 B2 | 8/2014 | Haddick et al. |
| 9,865,089 B2 | 1/2018 | Burns et al. |
| 10,198,871 B1 * | 2/2019 | Hariton .................. G06F 21/10 |
| 10,228,893 B2 * | 3/2019 | Todasco ................ G06Q 20/10 |
| 10,328,339 B2 * | 6/2019 | May ...................... A63F 13/428 |
| 2011/0285704 A1 | 11/2011 | Takeda et al. |
| 2012/0075285 A1 | 3/2012 | Oyagi et al. |
| 2013/0044128 A1 | 2/2013 | Liu et al. |
| 2013/0155058 A1 | 6/2013 | Golparvar-Fard et al. |
| 2015/0130790 A1 | 5/2015 | Vasquez, II et al. |
| 2016/0292920 A1 | 10/2016 | Sprock et al. |
| 2017/0269685 A1 | 9/2017 | Marks et al. |
| 2018/0232921 A1 | 8/2018 | Smith et al. |

\* cited by examiner

METHODS OF APPLYING VIRTUAL WORLD ELEMENTS INTO AUGMENTED REALITY

This application is a continuation of U.S. patent application Ser. No. 16/361,150, filed on Mar. 21, 2019. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is augmented reality and virtual reality systems.

BACKGROUND

In conventional augmented reality and virtual reality systems, the spectators are limited to experiencing a single creative expression. For example, in a real-time motion capture such as that as used to create portions of the movie, Mary Poppins Returns, the motion of an actor is captured, and at a later time during post-processing, one or more graphical elements are superimposed on the actor and/or their environment. For example, an actor playing a monster can be captured using a motion capture suit in front of a green screen. The motion capture suit can have a particular avatar superimposed during post-processing, and the green screen can be replaced with a background that fits the scene, such as, for example, a forest background. However, motion capture and green screen technologies limit a viewer of the scene to the singular creative expression of the scene as developed by the post-processing crew. As such, motion capture technologies do not allow for much flexibility in how the captured scenes can be experienced by different viewers.

In other examples, a scene captured by a camera can be analyzed to superimpose certain virtual reality elements on objects in an augmented reality interface. For example, a user can use cards with specific quick response (QR) codes that, when identified by a computing device, render a virtual element that is superimposed on the QR code. Similarly to the preceding example, the viewer is limited to one creative expression of the same scene. Though a rendered virtual element can perform one or more actions in the augmented reality environment, the virtual element remains a singular creative expression that every viewer shares.

In one illustrative example, in Pokemon Go™ and similar augmented reality video games, each player views the same user interface and the same Pokemon™ characters. Regardless of the location and circumstances of a given player, Pokemon Go™ depicts the same environment and characters, and fails to tailor the augmented reality environment based on the circumstances of that player. In this sense, Pokemon Go™ and conventional augmented reality games are limited to a singular creative expression.

The prior art recognizes the benefits of augmented reality and virtual reality systems, but there seems to be no teaching or suggestion in the prior art to tailor augmented reality and virtual reality systems to particular users.

U.S. Pat. No. 8,854,356 to Oyagi teaches a computer implemented image processing system for superimposing a particular virtual object and letter on top of an image or visual cue. Oyagi, however, discloses a system that superimposes a common virtual object for each of the different users, based on the particular image or surface identified by the image processing system. As such, Oyagi fails to contemplate the use of augmented and virtual reality interfaces that allow each user or groups of users to see a respective superimposed virtual object. Also, Oyagi does not appear to contemplate real-time social network interactions comprising a variety of users with a multitude of augmented and virtual reality viewing preferences.

US Patent Application Pub. No. 2015/0130790 to Vasquez teaches a method of superimposing virtual objects and virtual environments based on the placement of augmented reality markers. Similarly to the shortcomings of Oyagi, Vasquez fails to contemplate customized augmented and virtual reality object and environments based on the characteristics of a user or a group of users. Vasquez contemplates the delivery of the same virtual reality objects and environments to all users based on the augmented reality markers, without offering distinctive augmented and virtual reality experiences based on user-specific circumstances.

Oyagi, Vasquez, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

As social interaction through augmented and virtual reality environments proliferates, it opens up a significant number of networking possibilities and corresponding technical problems to be overcome. There is a need for hybrid augmented and virtual reality systems that advantageously allow visualization of virtual objects, specific to individual end-users, to be rendered in their individual augmented reality environments.

Additionally, there is a need for augmented reality and virtual reality systems to render changes in the objects and environments in real-time. For example, virtualizing the tracking of movements of a human user and a car in the real-world, in real-time, and concurrently superimposing an alien riding on the roof of the car.

Thus, there is still a need for systems and methods of providing tailored augmented and virtual reality experiences based on the same or similar environmental cues to different users, with the tailored augmented and virtual reality experiences offering different experiences to different users.

SUMMARY OF THE INVENTION

A main inventive concept herein comprises an augmented reality and virtual reality engine (AR-VR engine) that executes a method of retrieving virtual elements from a virtual environment, and incorporating them into a real world environment by identifying a virtual element in the virtual environment and a corresponding real-world object that shares at least one linking parameter to the virtual element. Following linking the virtual object and real-world object, the AR-VR engine renders the virtual element in an augmented reality interface in place of the real world element.

By focusing on systems and methods that tailor virtual reality and augmented reality hybrid experiences to specific end-users, it is thought that the currently claimed subject matter is a practical application of the underlying ideas, in ways that are neither conventional nor routine.

Various resources, features, aspects and advantages of the inventive subject matter will become more apparent from the following detailed description of preferred embodiments, along with the accompanying drawing figures in which like numerals represent like components.

The present invention advantageously tailors virtual reality and augmented reality environments to end-users based on their respective attributes.

DETAILED DESCRIPTION

It should be noted that while the following description is drawn to a computer-based system, various alternative configurations are also deemed suitable and may employ various computing devices including servers, interfaces, systems, databases, engines, controllers, or other types of computing devices operating individually or collectively.

One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing users to access mixed reality environments. Mixed reality environments can include any combination of virtual and augmented reality environments, and can be connected to each other in any manner.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, "real-world", "real world", and any similar terms means anything having detectable mass in the physical world. Common examples include everyday objects, such as houses, chairs, and people. At one extreme, "real-world" includes light, as photons of light have detectable mass.

As used herein, "visual transformation", "visually transformed", and any similar terms means transformation of a real-world object based on physical features, movement, and/or functionality of the object in the real-world. For example, a visual transformation of a human user based on physical features could mean a change in the visual appearance of the human into an older or younger version of the person, a change in gender or race, a change in clothing or hairstyle, a change in facial expression, or even a change into a non-human or partially human creature. For example, a visual transformation of a human user based on movement could mean a change in gait of the user, from an ordinary walk to a plodding shuffle. Similarly, a visual transformation of an object based upon functionality could render a house as a castle, a dog as a dragon, or a door to a hallway as an entrance to a cave or a dream world.

As used herein, "environment", "environments", and any similar terms means the physical space or object about a person, other than clothing, wigs, and accessories. For example, a chair in which a person is sitting is considered to be part of the environment, even if the person is tied to the chair. Similarly, clothing on a hanger in a closet in which a person is standing is considered environment of the person, until the person puts on the clothing. As another example, a Wii Fit™ motion sensor in the hands of a person is considered part of the environment.

With respect to inclusion of space about a person, environment to a given viewer is limited by the context of the person as viewed by that viewer. If a person is viewed as standing or sitting in a room, then the inside of the room as viewed by the viewer is considered the environment. However, if the viewer views a person in the window of a house, from outside the house, the environment is whatever portions of the house and yard is viewed by the viewer.

As used herein, "auditory transformation" means speech or emitted sound changed into a different language, accent, or sound. For example, a dog's bark can be transformed into a dragon's roar. In another example, a human user's American accent can be changed into a British accent. In yet another example, a human user saying the word "roar" can be transformed into the roar of a real-world lion. In yet another example, the ringing of a small bell could be transformed into a giant gong.

As used herein, "interacting with", "interaction with" and any similar terms means any action causing a perceptible change in the environment and/or a person. For example, a human user can interact with a real, virtual, or augmented reality object by changing movement, size dimensions, number, color, density, power, or any other quality of the object.

As used herein, "real-time", "real time" and any similar terms means the actual time during which a process or event occurs, as well as a short time (less than ten seconds) required for computer processing, transmission latency, and intentional lags for someone to experience the process or event. Real-time having delays totaling no more than ten seconds are considered herein to be fuzzy real-time, real-time having delays totaling no more than five seconds are considered herein to be intermediate real-time, and real-time having delays totaling no more than one second are considered herein to be close real-time.

As used herein, "virtual objects", "virtual things" and any similar terms mean objects perceivable by a viewer, but having no real-world mass. For example, a virtual ball could be rendered using an appropriate electronic display or other rendering technology, but without the rendering technology, the virtual ball could not be sensed with any of the five senses of touch, smell, sound, sight, and taste. Among other things, a virtual object can represent an ability or a power, including, for example, a force field set around a human user, a quantity of bullets, an energy level, a health level, or an ability to see in the dark.

Figure 1:
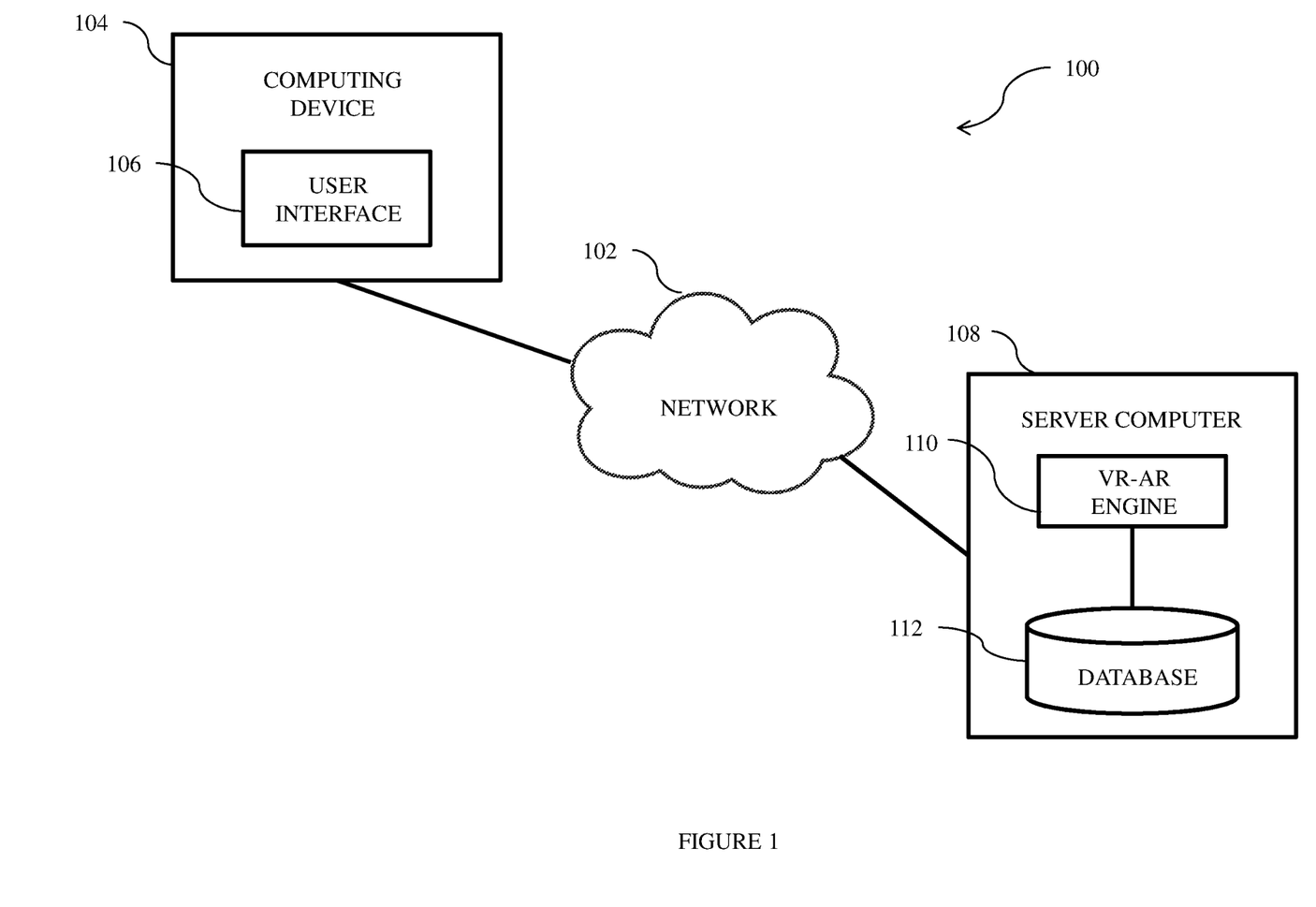
FIG. 1 is a functional block diagram illustrating a distributed data processing environment.

FIG. 1 is a functional block diagram illustrating a distributed data processing environment having an inventive VR-AR Engine.

The term "distributed" as used herein means a computer system that includes multiple, physically distinct devices configured to operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to VR-AR engine 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface 106 is mobile application software. Mobile application software, or an "app," is a computer program designed to run on smart phones, tablet computers, and any other mobile devices.

User interface 106 can allow a user to register with and configure VR-AR engine 110 (discussed in more detail below) to enable a user to access a mixed reality space. It is contemplated that user interface 106 can allow a user to provide any information to VR-AR engine 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

Database 112 is a repository for data used by VR-AR engine 110. In the depicted embodiment, VR-AR engine 110 resides on server computer 108. However, database 112 can reside anywhere within a distributed data processing environment provided that VR-AR engine 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
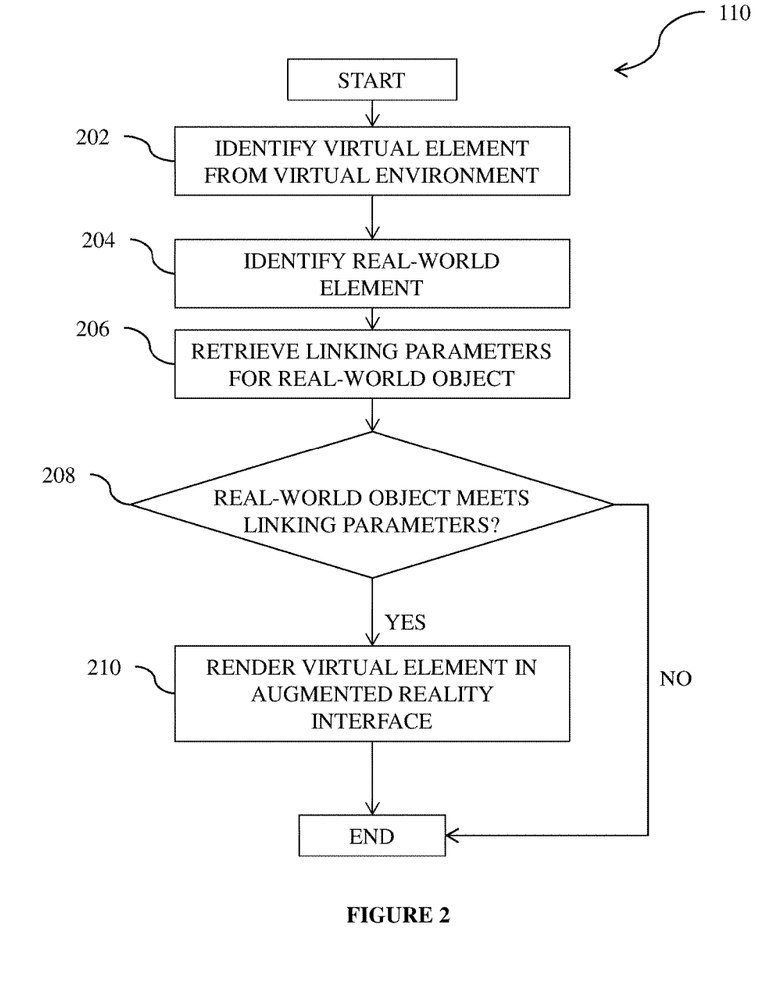
FIG. 2 is a schematic of a method of managing access to primary sub-environments in a virtual environment.

FIG. 2 is a schematic of a method of applying a virtual element from a virtual environment to a real world element.

VR-AR engine 110 identifies a virtual element from a virtual environment (step 202).

A virtual environment includes a combination of virtual elements and augmented reality elements. Augmented reality elements are derived from physical spaces in the real world. In preferred embodiments, the virtual environment comprises both virtual elements and augmented reality elements presented in the virtual environment. For example, a virtual environment can be a three-dimensional representation of the Earth, where augmented reality elements are distributed within the three-dimensional representation of the Earth. In a more specific example, the augmented reality elements can be tied to specific individuals, and contain representations of the individuals' real world environments by any means known in the art, including 360° cameras, conventional video cameras, and stitched photos from cameras.

Virtual elements can include anything rendered in the virtual environment. In one embodiment, the virtual element is a render of a physical object. For example, a sword rendered in the virtual environment of a video game can be a virtual element. In another example, a building in the virtual environment of a video game can be a virtual element.

In another embodiment, the virtual element is a render of a non-physical element. For example, the virtual element can be based on at least one of light, sound, color, and movement. In a specific example, the virtual element can be the color of the light that hits one or more virtual objects. In another specific example, the virtual element can be the manner in which an object moves, such as a vehicle moving through a virtual landscape.

In yet another embodiment, the virtual element can be a combination of a render of a physical object and a render of a non-physical object. For example, the virtual element can be a sun in the sky in the virtual environment and the accompanying directional lighting and colors associated with the light emitted from the sun in the virtual environment. In another example, the virtual element can be a render of a wolf and the accompanying sounds of the wolf howling during a full moon.

VR-AR engine 110 identifies a real world element (step 204).

It is contemplated that VR-AR engine 110 can identify real world objects in any manner known in the art. In a preferred embodiment, VR-AR engine 110 can use image recognition to identify a real world object. For example, VR-AR engine 110 can identify an oblong, brown object with the silhouette of a baseball bat and identify that the object is indeed a baseball bat.

In some embodiments, VR-AR engine 110 can identify real world objects with the assistance of a user. For example, a user can point a camera to a car and identify that object as a car. In other examples, the user can also input different properties associated with a real world object. Properties can include physical and non-physical properties. For example, a user can input that a foam object is flexible and made of a resilient material.

VR-AR engine 110 retrieves linking parameters for the real world object (step 206)

Linking parameters can include any rules that determine whether the real world object is linked to a virtual object.

In some embodiments, linking parameters focus on the physical properties of an object. For example, linking parameters can set forth a rule that any physical object that has a particular level of rigidity cannot be linked with a weapon in the virtual environment in order to avoid users swinging hard objects around like swords in an augmented reality interface.

In another example, linking parameters can determine that a foam pool noodle exhibiting elastic properties and low weight can be associated with a sword in a virtual environment because the pool noodle poses little to no risk of injury if swung around.

In another embodiment, linking parameters focus on non-physical properties of an object. For example, linking parameters can set forth a rule that an object must fall within a particular color range (e.g., maroon to pink) for a similarly colored object in the virtual environment in order to be linked.

VR-AR engine 110 determines whether the real world object meets linking parameters (decision block 208).

In preferred embodiments, VR-AR engine 110 determines whether the real world object meets linking parameters based on desirable physical properties. It is contemplated that the linking parameters are not necessarily linked based on similar physical properties.

In some embodiments, the linking parameters limit linking of virtual objects to real world objects that do not share similar physical properties. For example, the linking parameters can set forth a rule that real guns or any object reminiscent of a real gun (e.g., a toy replica) cannot be linked to virtual weapons.

In another example, the linking parameters can set forth a rule that bodies of water cannot be linked to solid ground in the virtual world in order to avoid causing individuals from running into pools based on an augmented reality overlay of solid land where there a body of water.

In other embodiments, the linking parameters cause VR-AR engine 110 to link virtual and physical objects based on similar physical properties. For example, the linking parameters can cause VR-AR engine 110 to link a family dog to a virtual animal companion based on similar sizing, coloration, and movement patterns between the real world and virtual object.

Responsive to determining that the real world object does not meet linking parameters, VR-AR engine 110 ends ("NO" branch, decision block 208).

Responsive to determining that the real world object meets the linking parameters ("YES" branch, decision block 208), VR-AR engine 110 renders the virtual element in the augmented reality interface (step 210).

Figure 3:
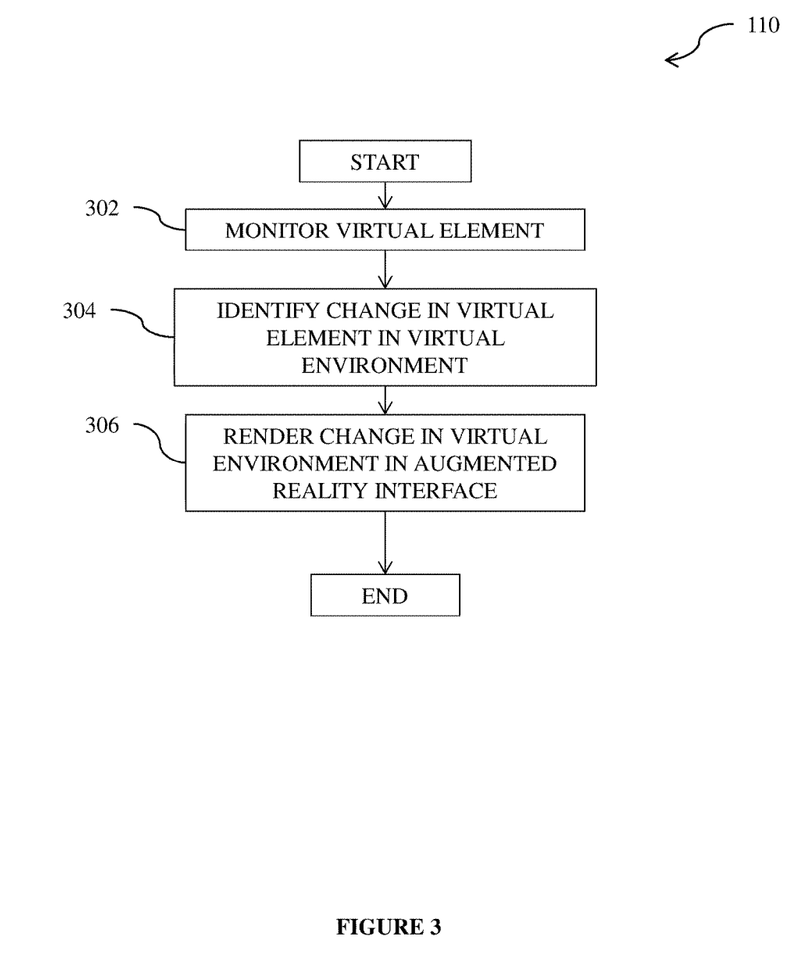
FIG. 3 is a schematic of a method of managing user access to a secondary sub-environment in a primary sub-environment.

FIG. 3 is a schematic of a method of tracking changes to virtual elements and applying the changes in an augmented reality interface.

VR-AR engine 110 monitors the virtual element (step 302).

VR-AR engine 110 monitors any physical and/or non-physical changes to virtual objects. For example, VR-AR engine 110 can monitor a player's armor in-game and monitor if there are any upgrades to the armor in the game or any damage accumulated on the armor in the game. In another example, VR-AR engine 110 can monitor any color changes or new sound effects associated with a player's armor in the game.

In another example, VR-AR engine 110 can monitor a building in a video game for any changes to the building over the course of the game. In a more specific example, VR-AR engine 110 can identify an in-game building and monitor any additional structures added to the building over the course of the video game in which the building is located.

VR-AR engine 110 identifies a change in the virtual element in the virtual environment (step 304).

VR-AR engine 110 renders the change in the augmented reality interface (step 306).

VR-AR engine 110 renders the change in the augmented reality interface to overlay a virtual rendering of the virtual object over the real world object. For example, VR-AR engine 110 can render damage accumulated on body armor in a video game over a jacket of a user. In another example, VR-AR engine 110 can render a new building unlocked in a video game over a real world building of similar size. In yet another example, VR-AR engine 110 can render new special effects associated with an unlocked ability of a weapon in a video game to a corresponding real world object. In a more specific example, VR-AR engine 110 can add flames to an augmented reality render of a sword over a foam pool noodle if the player unlocks a fire-based skill for the weapon in-game.

Figure 4:
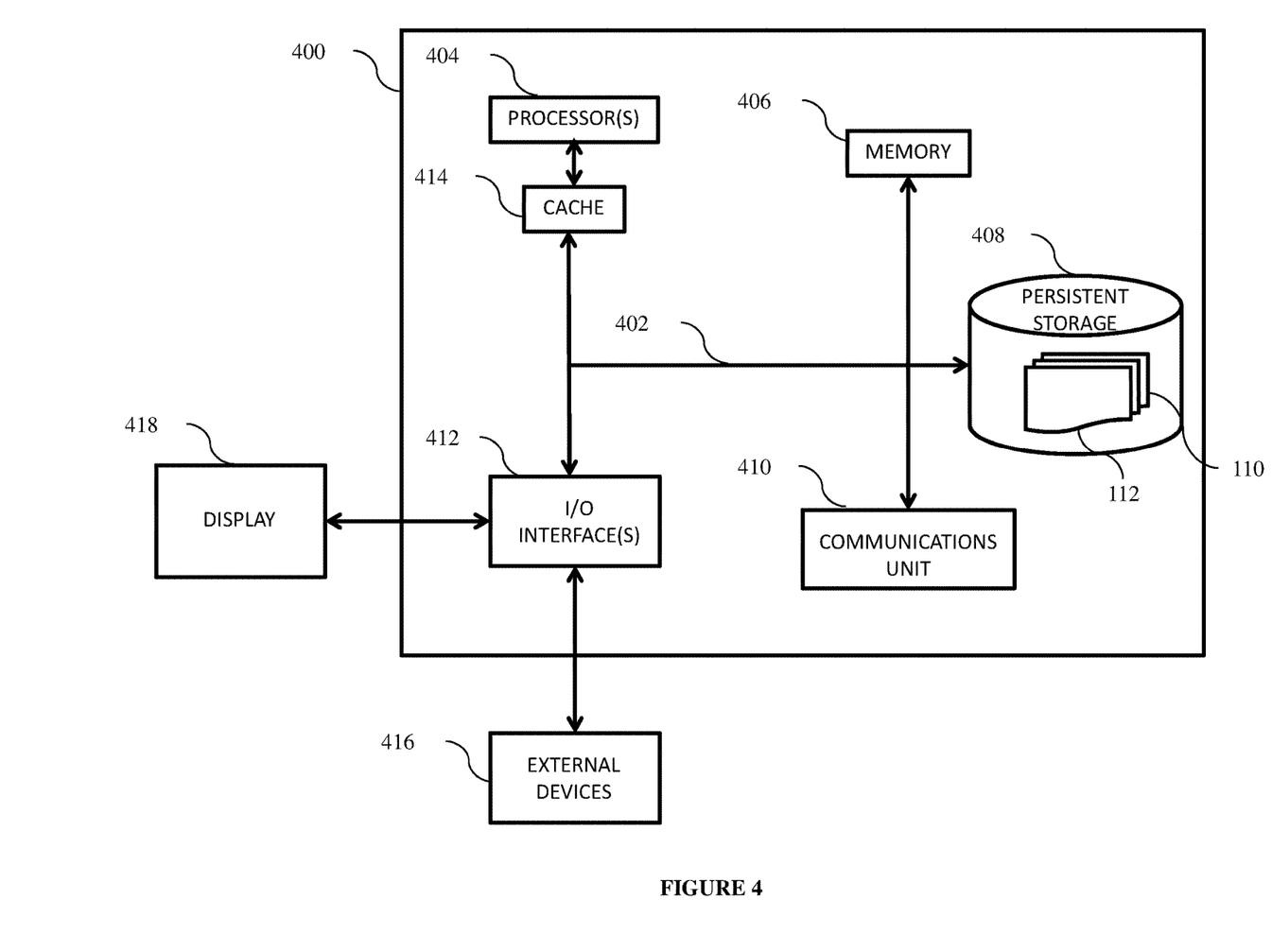
FIG. 4 depicts a block diagram of components of the server computer executing the VR-AR engine within the distributed data processing environment of FIG. 1.

FIG. 4 depicts a block diagram of components of the server computer executing VR-AR engine 110 within the distributed data processing environment of FIG. 1. FIG. 4 is not limited to the depicted embodiment. Any modification known in the art can be made to the depicted embodiment.

In one embodiment, the computer includes processor(s) 404, cache 414, memory 406, persistent storage 408, communications unit 410, input/output (I/O) interface(s) 412, and communications fabric 402.

Communications fabric 402 provides a communication medium between cache 414, memory 406, persistent storage 408, communications unit 410, and I/O interface 412. Communications fabric 402 can include any means of moving data and/or control information between computer processors, system memory, peripheral devices, and any other hardware components.

Memory 406 and persistent storage 408 are computer readable storage media. As depicted, memory 406 can include any volatile or non-volatile computer storage media. For example, volatile memory can include dynamic random access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 406 and persistent storage 408 are random access memory and a hard drive hardwired to computing device 104, respectively. For example, computing device 104 can be a computer executing the program instructions of VR-AR engine 110 communicatively coupled to a solid state drive and DRAM.

In some embodiments, persistent storage 408 is removable. For example, persistent storage 408 can be a thumb drive or a card with embedded integrated circuits.

Communications unit 410 provides a medium for communicating with other data processing systems or devices, including data resources used by computing device 104. For example, communications unit 410 can comprise multiple network interface cards. In another example, communications unit 410 can comprise physical and/or wireless communication links.

It is contemplated that VR-AR engine 110, database 112, and any other programs can be downloaded to persistent storage 408 using communications unit 410.

In a preferred embodiment, communications unit 410 comprises a global positioning satellite (GPS) device, a cellular data network communications device, and short to intermediate distance communications device (e.g., Bluetooth®, near-field communications, etc.). It is contemplated that communications unit 410 allows computing device 104 to communicate with other computing devices 104 associated with other users.

Display 418 is contemplated to provide a mechanism to display information from VR-AR engine 110 through computing device 104. In preferred embodiments, display 418 can have additional functionalities. For example, display 418 can be a pressure-based touch screen or a capacitive touch screen.

In yet other embodiments, display 418 can be any combination of sensory output devices, such as, for example, a speaker that communicates information to a user and/or a vibration/haptic feedback mechanism. For example, display 418 can be a combination of a touchscreen in the dashboard of a car, a voice command-based communication system, and a vibrating bracelet worn by a user to communicate information through a series of vibrations.

It is contemplated that display 418 does not need to be physically hardwired components and can, instead, be a collection of different devices that cooperatively communicate information to a user.

Figure 5:
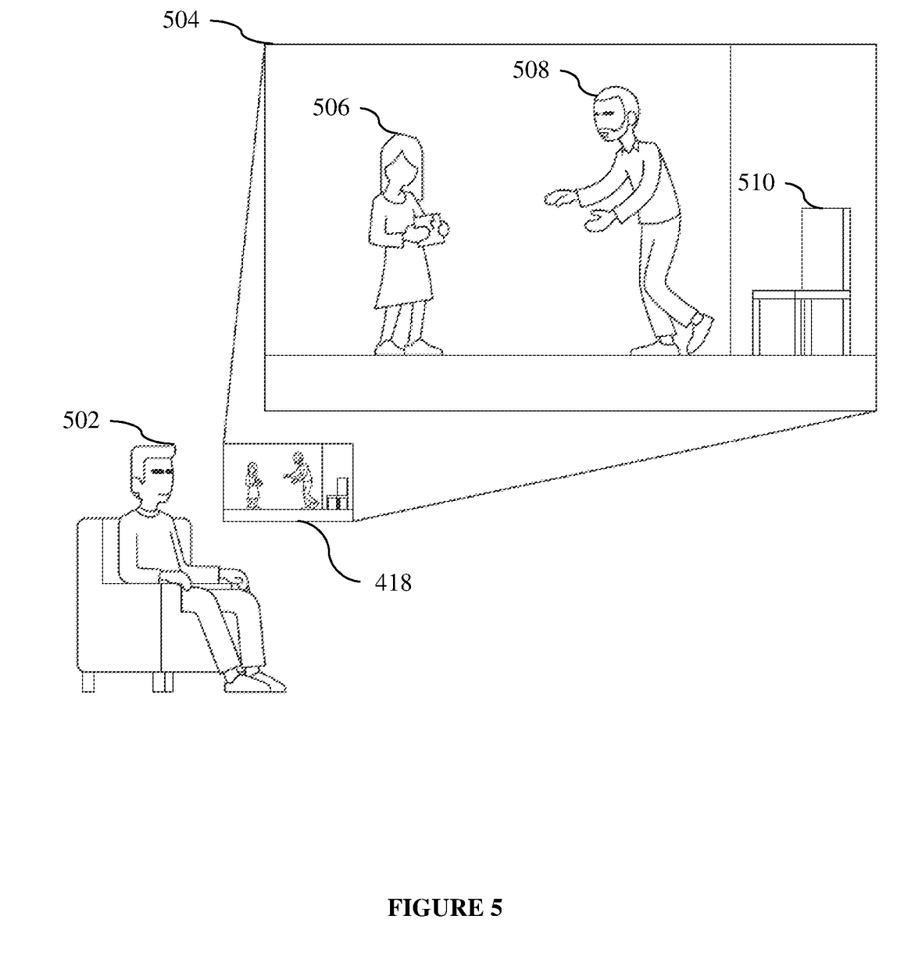
FIG. 5 depicts a first user and associated first display, depicting an augmented reality interface without virtual reality elements incorporated.

FIG. 5 depicts a display with an augmented reality interface without virtual reality elements incorporated.

In the depicted embodiment, user 502 views a scene 504 through display 418. Scene 504 represents an unedited scene. For example, scene 504 can be from raw footage or an unedited virtual environment. Scene 504 includes woman 506, man 508, and chair 510.

Figures 6A, 6B, 6C:
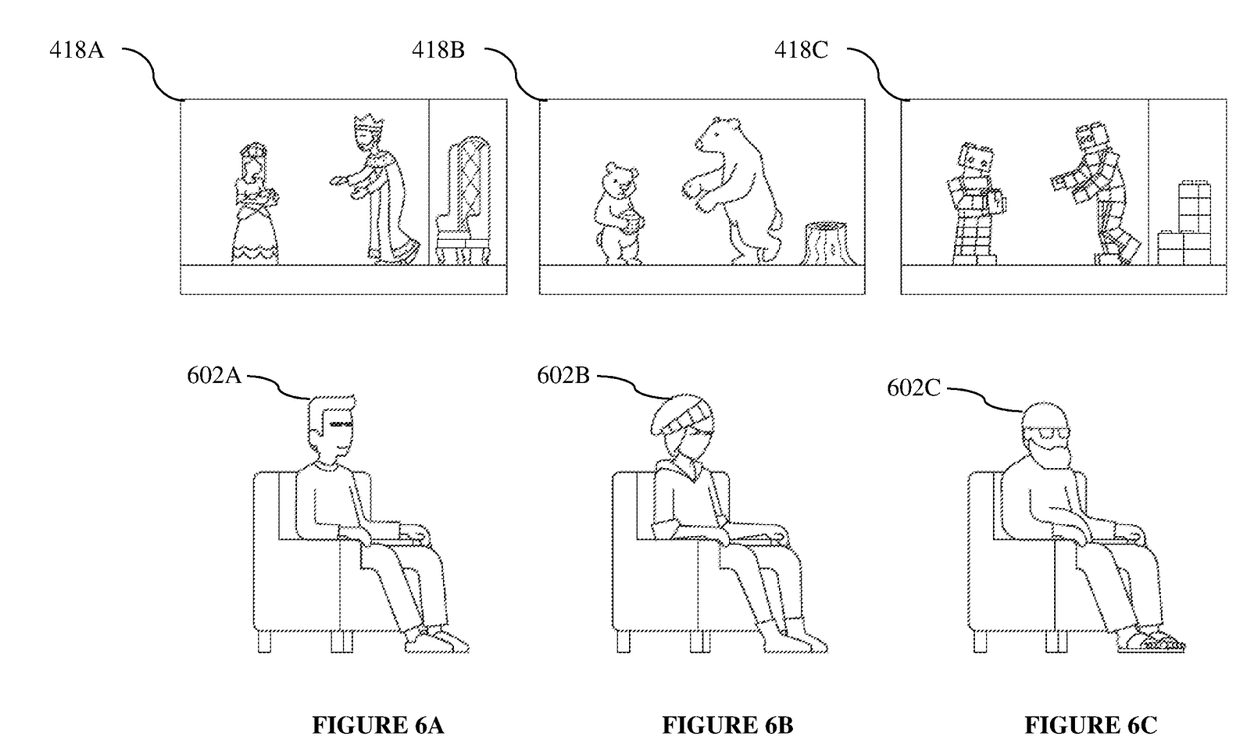
FIG. 6A depicts a second user and associated second display, depicting an augmented reality interface incorporating a first set of user-specific virtual elements.
FIG. 6B depicts a third user and associated third display, depicting an augmented reality interface incorporating a second set of user-specific virtual elements.
FIG. 6C depicts a fourth user and associated fourth display, depicting an augmented reality interface incorporating a third set of user-specific virtual elements.

FIG. 6A depicts a first augmented perspective 418A with an augmented reality interface incorporating a first set of user-specific virtual elements. For example, first user 602A can have attributes including preferences for content set in the Middle Ages, and AR-VR engine 110 can accordingly render woman 506 as a princess, man 508 as a king, and chair 510 as a throne.

FIG. 6B depicts a third display with an augmented reality interface incorporating a second set of user-specific virtual elements.

FIG. 6B depicts a second augmented perspective 418B with an augmented reality interface incorporating a second set of user-specific virtual elements. For example, second user 602B can have attributes including preferences for animal shows, and AR-VR engine 110 can accordingly render woman 506 as a bear cub, man 508 as a parent bear, and chair 510 as a sawed-off tree stump.

FIG. 6C depicts a fourth display with an augmented reality interface incorporating a third set of user-specific virtual elements.

FIG. 6C depicts a third augmented perspective 418C with an augmented reality interface incorporating a second set of user-specific virtual elements. For example, third user 602C can have attributes including preferences for low-resolution games, and AR-VR engine 110 can accordingly render woman 506 as a small polygonal man, man 508 as a large polygonal man, and chair 510 as a chair made of toy blocks.

Though FIGS. 6A-6C depict stationary users in armchairs, it is contemplated that any user can move in a three dimension augmented reality enhanced space and view the same scene. For example, each user can see through their respective augmented reality perspectives from three respective, different positions in the original scene. For example, first user 602A can be behind chair 510, second user 602B can be beside woman 506, and third user 602C can view from a top-down perspective.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of using one or more processors to provide an augmented reality interface for use by a first user and a second user, comprising:
retrieving a first set of user data associated with the first user, wherein the first set of user data is associated with a third-party virtual environment;
rendering a first visual transformation of the first user, wherein the first visual transformation includes a first user appearance and a transformed visual environment of a first real-world environment within a first threshold distance of the first user;

rendering an electronic interface through which the second user can interact with at least one of the first visual transformation of the first user and the transformed visual environment;
detecting a change in a plurality of virtual objects associated with the first user and the third-party virtual environment;
identifying a plurality of real-world objects corresponding to the plurality of virtual objects using a sensor, wherein the sensor is physically separated from the real-world object;
linking the plurality of real-world objects and the plurality of virtual objects according to corresponding linking parameters associated with physical properties of each of the plurality of real-world objects;
determining that at least one of the linking parameters satisfy a safety rule;
rendering the change associated with the virtual object associated with the linking parameter that satisfies the safety rule onto the real-world object;
determining that at least one of the linking parameters from the plurality of linking parameters fails to satisfy the safety rule; and
for the linking parameter that fails to satisfy the safety rule, refraining from rendering the corresponding virtual object in association with the respective real-world object.

2. The method of claim 1, wherein the virtual object represents a visual appearance of a user avatar.

3. The method of claim 1, wherein the virtual object represents a monetary value.

4. The method of claim 1, wherein the virtual object represents an ability or power.

5. The method of claim 1, wherein the virtual object represents a resource level.

6. The method of claim 1, further comprising:
retrieving a second set of user data associated with the second user, wherein the second set of user data is associated with the third-party virtual environment; and
rendering a second visual transformation of the second user, wherein the second visual transformation includes a second user appearance and the transformed visual environment of a second real-world environment within a second threshold distance of a second user, and wherein the first real-world environment and the second real-world environment overlap.

7. The method of claim 1, wherein the step of rendering a first visual transformation of the first human user includes the first human user controlling at least a portion of an appearance of the first transformed human user to one or more third parties.

8. The method of claim 1, wherein the step of rendering a second visual transformation of the second human user includes the second human user controlling at least a portion of an appearance of the second transformed human user to one or more third parties.

9. The method of claim 1, wherein the safety rule comprises a prohibition on rendering a virtual object in association with a real-world weapon.

10. The method of claim 1, wherein the safety rule comprises a prohibition on rendering a solid-appearing virtual surface over a non-solid real-world surface.

* * * * *